W. A. CASWELL.
HOSE-COUPLING.
Reissued Aug. 8, 1876.
No. 7,251.
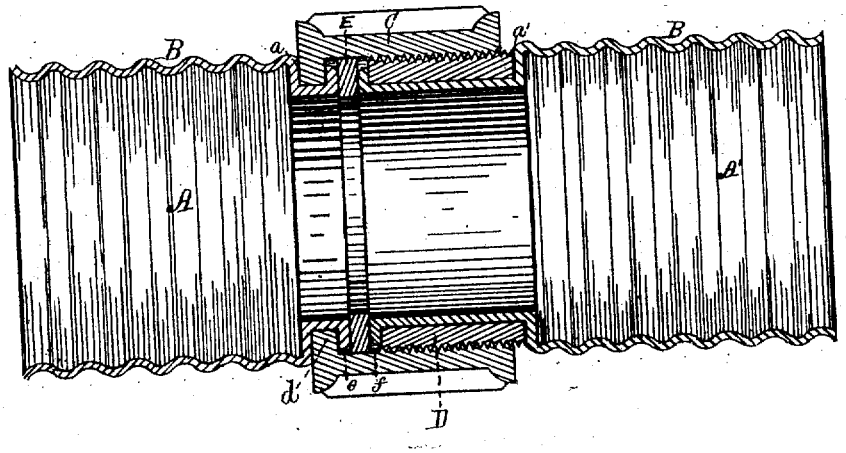
Witnesses
N. Cowles
N. H. Sherburne
Inventor:
William A. Caswell
By Gridley & Sherburne
Attys

UNITED STATES PATENT OFFICE.

WILLIAM A. CASWELL, OF CHICAGO, ILLINOIS, ASSIGNOR OF ONE-HALF INTEREST TO EVERET B. PRESTON.

IMPROVEMENT IN HOSE-COUPLINGS.

Specification forming part of Letters Patent No. 168,970, dated October 19, 1875; reissue No. 7,251, dated August 8, 1876; application filed April 18, 1876.

*To all whom it may concern:*

Be it known that I, WILLIAM A. CASWELL, of Chicago, in the county of Cook and State of Illinois, have invented certain new and useful Improvements in Hose-Couplings; and I do hereby declare the following to be a full, clear, and exact description thereof, which will enable others skilled in the art to which my invention appertains to make and use the same, reference being had to the accompanying drawing, forming part of this specification, in which—

Figure 1 represents a longitudinal central section of a hose-coupling embodying my said invention.

Like letters of reference indicate like parts.

The object of my invention is to provide a means for more perfectly connecting the several parts of a hose-coupling, and so as to form a swivel-connection which will admit of one of the parts being turned independently of the other; and to that end my invention consists in the method of attaching one of the tail-pieces to the swivel, by providing the swivel with an inwardly-projecting flange, adapted to bear against the shoulder of an outwardly-projecting flange on the tail-piece; also, in constructing one of the tail-pieces with a contracted end, upon which a screw-threaded sleeve is secured by an outwardly-projecting flange on the tail-piece, the said sleeve being adapted to screw into the swivel, whereby the two parts are connected together, as is hereinafter more fully described.

In the drawing, A and A′ represent the tail-pieces, each consisting of a short piece of metal tubing of the proper diameter to tightly fill the cavity in the hose, and screw-threaded externally, as shown at B, by which means they are firmly secured to, and within, their respective sections of the hose by being screwed therein. One end of each of the tail-pieces is so contracted, or made less in diameter than the threaded portion B, as to form upon each a shoulder, *a* and *a′*, as shown in Fig. 1. C is the swivel proper, consisting of an annular metal band, screw-threaded at one end internally, and provided at the opposite end with an inwardly-projecting flange or shoulder, *d*, the inner circumference or bore of which snugly fits the contracted end of the tail-piece A. The contracted end of the tail-piece A, after being passed through the bore in shoulder *d* of the swivel, so as to bring the end of the swivel against shoulder *a* of the tail-piece, is expanded at its extreme end by being spun or otherwise, so as to form an outwardly-projecting flange or shoulder, *e*, which bears against the inner end of shoulder *d* of the swivel, thereby firmly connecting the swivel to the tail-piece, and in such a manner as to allow it to freely turn thereon. D is a metal sleeve fitted upon and around the contracted end of the tail-piece A′ in such a manner as to abut against shoulder *a′* and is secured in place by expanding the extreme end of the tail-piece by spinning or otherwise, so as to form an outwardly-projecting flange or shoulder, *f*, which bears firmly against the end of the sleeve, as shown in Fig. 1. The sleeve is rigidly fitted on the contracted part of the tail-piece, so that it cannot turn thereon, and is screw-threaded externally, so as to admit of being screwed into the threaded portion of the swivel, by which means the sleeve and swivel are connected together.

The screw-threads on the respective tail-pieces A and A′ may have the cross-sectional form shown, or, if preferred, they may be quadrantal in cross-section.

E is a flexible casket or packing-ring, which is interposed between the shoulders *e* and *f* of the respective tail-pieces, and forms a tight joint, when the sleeve is screwed into the swivel, so as to compress the packing-ring.

One great advantage the mode of constructing the tail-piece, and connecting the swivel thereto, as described, possesses over the ordinary method of connecting said parts is, that the swivel turns against a metallic shoulder, which prevents it from coming into contact with the end of the hose when properly applied, and is always free to turn.

Having thus described my invention, what I claim as new, and desire to secure by Letters Patent, is—

1. The method, herein described, of connecting the swivel in a hose-coupling by expanding the retaining-shoulder *e* into interlocking position with the shoulder *d* in the swivel, as specified.

2. The male part of a hose-coupling, composed of a tail-piece, or its equivalent, and a screw-threaded sleeve, secured upon the tail-piece by the shoulder *f* expanded against the end of the sleeve, substantially as specified.

3. In a hose-coupling the tail-pieces A A′, contracted at their ends, and adapted to be expanded to form the retaining-shoulders *e* and *f*, substantially as and for the purpose specified.

4. The combination of the packing-ring E with the tail-pieces A A′, provided with the shoulders *e* and *f*, sleeve D, and swivel C, substantially as and for the purpose specified.

WILLIAM A. CASWELL.

Witnesses:
N. C. GRIDLEY,
N. H. SHERBURNE.